United States Patent
Le Jaouen et al.

(10) Patent No.: US 9,463,828 B2
(45) Date of Patent: Oct. 11, 2016

(54) STRUCTURE INTENDED TO HOLD AN ELECTRIC BATTERY FOR POWERING AN ELECTRIC MOTOR FOR DRIVING A MOTOR VEHICLE

(75) Inventors: Guillaume Le Jaouen, Montigny le Bretonneux (FR); Cyrille Mahe, Yerres (FR); Francois Le Duc, Clamart (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 744 days.

(21) Appl. No.: 13/640,218

(22) PCT Filed: Oct. 11, 2011

(86) PCT No.: PCT/FR2011/052368
§ 371 (c)(1),
(2), (4) Date: Oct. 18, 2012

(87) PCT Pub. No.: WO2012/049418
PCT Pub. Date: Apr. 19, 2012

(65) Prior Publication Data
US 2013/0045407 A1 Feb. 21, 2013

(30) Foreign Application Priority Data

Oct. 13, 2010 (FR) ...................... 10 58325

(51) Int. Cl.
| H01M 2/10 | (2006.01) |
| B60K 1/04 | (2006.01) |
| B60L 11/18 | (2006.01) |
| B62D 21/15 | (2006.01) |

(52) U.S. Cl.
CPC ............. *B62D 21/157* (2013.01); *B60K 1/04* (2013.01); *B60L 11/1877* (2013.01); *H01M 2/1083* (2013.01); *B60K 2001/0438* (2013.01); *Y02T 10/7005* (2013.01); *Y02T 10/705* (2013.01)

(58) Field of Classification Search
None
See application file for complete search history.

(56) References Cited

U.S. PATENT DOCUMENTS

| 5,501,289 A * | 3/1996 | Nishikawa | ............... B60K 1/04 180/65.1 |
| 7,083,223 B2 * | 8/2006 | Forsman | ............... B62D 21/15 296/187.09 |

(Continued)

FOREIGN PATENT DOCUMENTS

| DE | 11 2008 000 351 | 2/2010 |
| JP | 7-108956 | * 4/1995 |

(Continued)

OTHER PUBLICATIONS

French Search Report Issued Jun. 29, 2011 in FR 10 58325 Filed Oct. 13, 2010.
International Search Report Issued May 16, 2012 in PCT/FR11/52368 Filed Oct. 11, 2011.

*Primary Examiner* — Jonathan Crepeau
(74) *Attorney, Agent, or Firm* — Oblon, McClelland, Maier & Neustadt, L.L.P.

(57) ABSTRACT

A structure configured to hold an electric battery for powering an electric motor, or to hold an electric battery for powering an electric motor for driving a motor vehicle, the structure including a rigid element, above and/or below which the battery is configured to be located, and, laterally on either side of the rigid element, energy absorbing elements, the energy absorbing elements including deformable members that extend at least approximately in a lateral direction.

15 Claims, 2 Drawing Sheets

(56) References Cited

U.S. PATENT DOCUMENTS

| | | |
|---|---|---|
| 2004/0104602 A1* | 6/2004 | Cardimen ............ B62D 25/025 296/204 |
| 2007/0215399 A1 | 9/2007 | Watanabe et al. |
| 2010/0001553 A1 | 1/2010 | Yoda |
| 2010/0170736 A1 | 7/2010 | Watanabe et al. |
| 2010/0289295 A1 | 11/2010 | Yoda et al. |

FOREIGN PATENT DOCUMENTS

| | | |
|---|---|---|
| WO | 2005 084985 | 9/2005 |
| WO | 2009 139229 | 11/2009 |

* cited by examiner

STRUCTURE INTENDED TO HOLD AN ELECTRIC BATTERY FOR POWERING AN ELECTRIC MOTOR FOR DRIVING A MOTOR VEHICLE

BACKGROUND

The present invention relates to a structure intended to hold an electric battery, especially an electric battery for powering an electric drive motor for a motor vehicle. It also relates to a chassis of a motor vehicle having such a structure. Finally, it relates to a motor vehicle comprising such a structure or such a chassis.

Certain motor vehicles, such as electric or hybrid vehicles, comprise an electric battery for powering an electric drive motor. For safety concerns, it is necessary to be sure of the integrity of the electric battery for powering the motor in different collision configurations:

Head-on collision;
Rear-end collision;
Side collision against a pole.

The objective is to avoid any electric shock and/or any short circuit capable of generating a fire during or after a collision. To achieve this, it is necessary to guarantee the integrity of the battery casing and to prevent any possibility of contact with its internal elements during a collision. A crack in the battery casing is acceptable, but it must not exceed a certain size guaranteeing that it is impossible for a user to pass a finger through it.

The architecture of electric vehicles is specific. The electric battery is not necessarily installed in place of the fuel tank of a vehicle having a traditional internal combustion engine. In certain cases, its installation between the two axles of the vehicle makes it vulnerable to collision, especially to a perpendicular side collision against a pole.

According to certain architectures, the electric battery is disposed at the rear end or the front end (generally in place of the fuel tank of a vehicle having an internal combustion engine). This positioning makes it possible to take advantage of the transverse stiffness of the end and to assure integrity of the battery during a side collision.

BRIEF SUMMARY

The objective of the invention is to provide a structure intended to hold an electric battery, eliminating the disadvantages mentioned in the foregoing and improving the known prior art structures. In particular, the invention proposes a simple, reliable and robust structure with which the integrity of the electric battery can be assured during a side collision against the motor vehicle.

According to the invention, the structure intended to hold an electric battery for powering an electric motor, especially an electric battery for powering an electric drive motor for a motor vehicle, comprises a rigid element above and/or below which the battery is intended to be located, and comprises, laterally on each side of the rigid element, energy-absorbing elements, the energy-absorbing element comprising deformable members extending at least substantially in a lateral direction.

The area of the vertical projection of the battery may be included or at least substantially included in the area of the vertical projection of the rigid element.

The rigid element may comprise one or more cross members.

The rigid element may comprise one or more frame rails.

The rigid element may comprise two frame rails connected to one another by several cross members.

The energy-absorbing element may comprise deformable members disposed at least in substantially transverse direction on both sides of the rigid element.

The energy-absorbing element may comprise two beams disposed at least in substantially longitudinal direction on both sides of the rigid element.

The energy-absorbing element may comprise two beams disposed at least in substantially longitudinal direction on both sides of the rigid element and deformable members disposed at least in substantially transverse direction on both sides of the rigid element, the deformable members mechanically connecting the rigid element to the beams.

According to the invention, a motor-vehicle chassis comprises a structure defined in the foregoing.

According to the invention, a hybrid or electric motor vehicle, especially a four-wheel electric vehicle, comprises a structure defined in the foregoing.

BRIEF DESCRIPTION OF THE DRAWINGS

The attached drawings represent, by way of example, a motor-vehicle chassis comprising an embodiment of a structure according to the invention.

DETAILED DESCRIPTION

Figure 1:
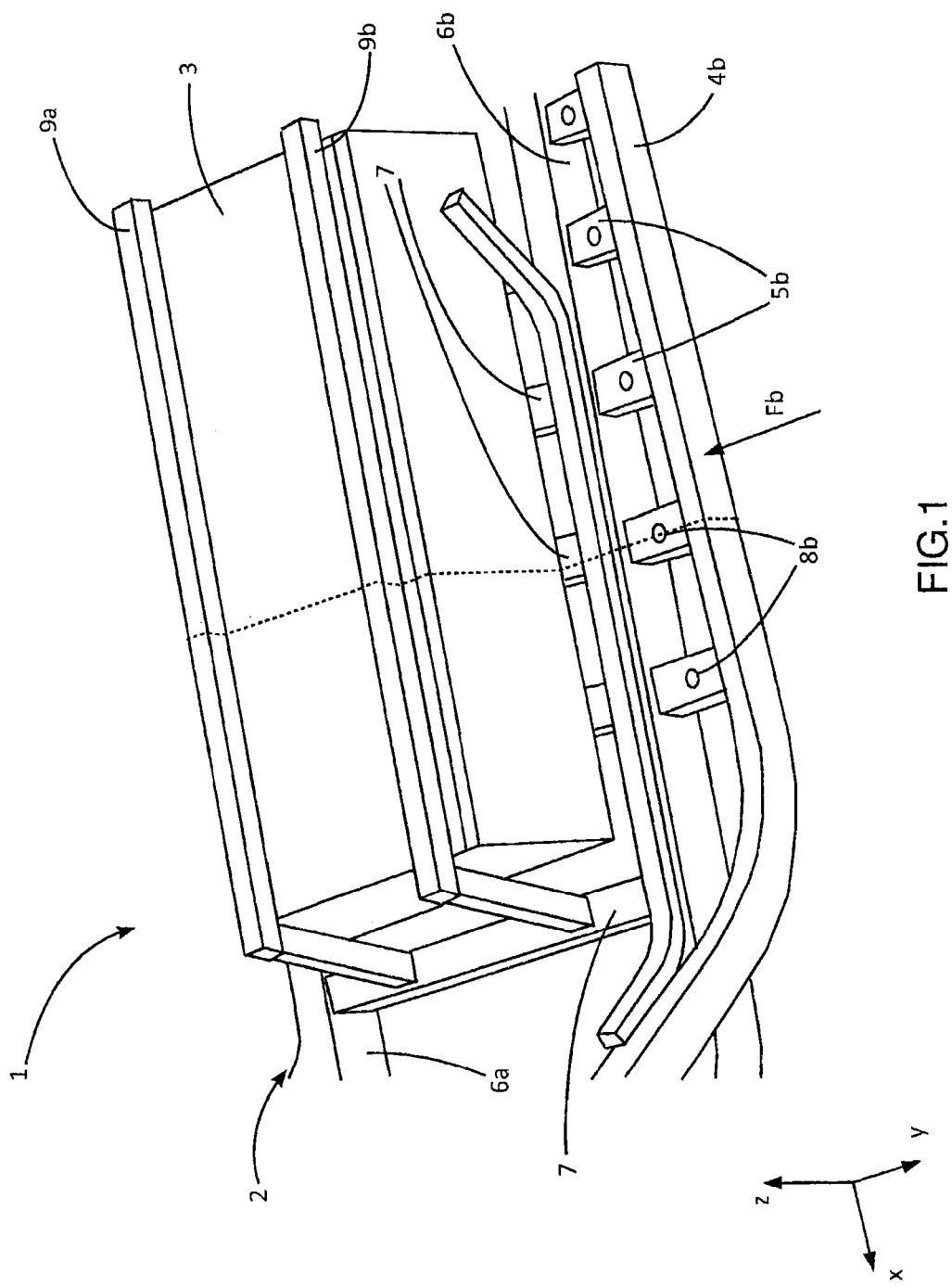
FIG. 1 is a perspective view of a motor-vehicle chassis comprising an embodiment of the structure according to the invention.
Figure 2:
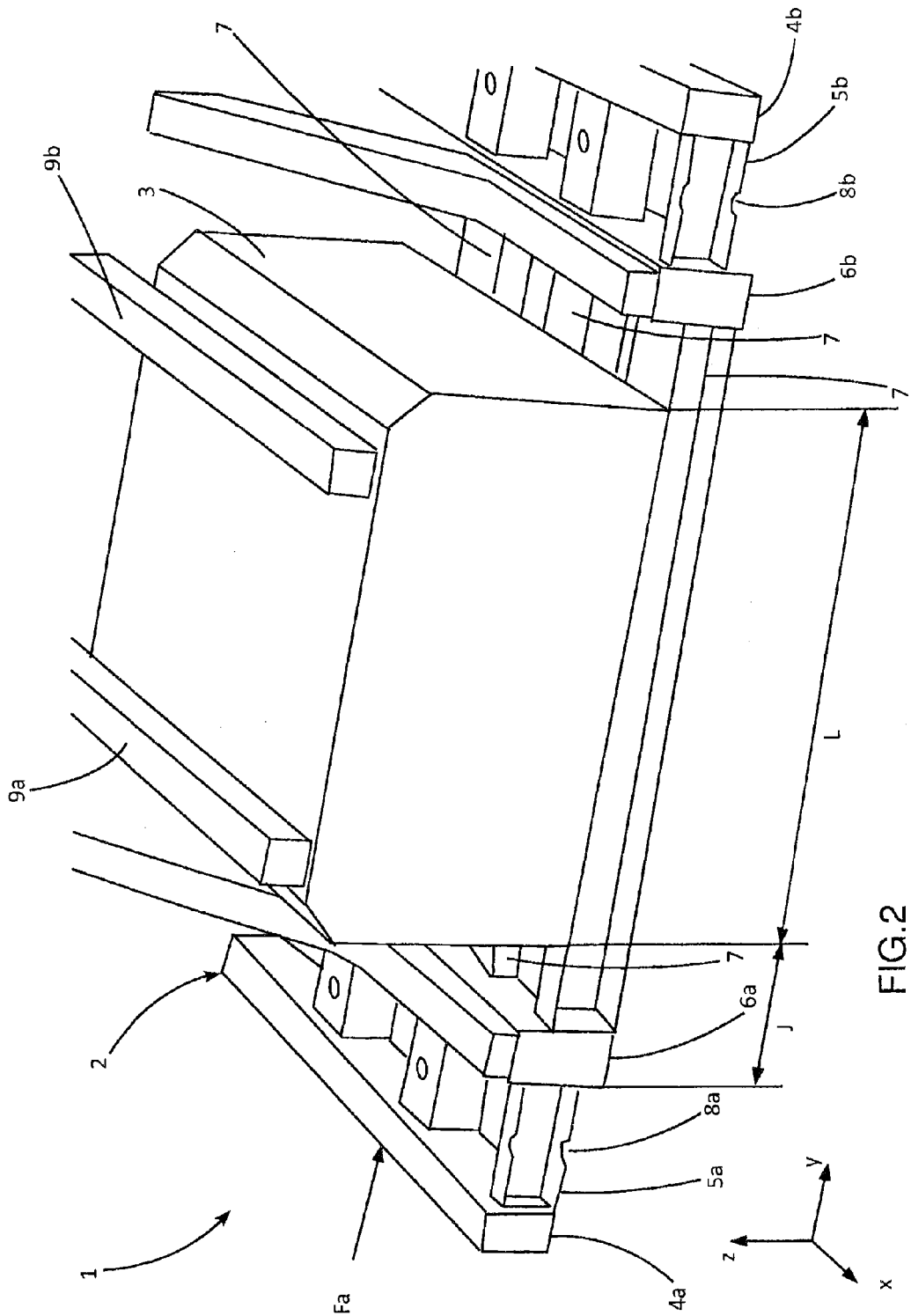
FIG. 2 is a cross-sectional view in perspective of the section, indicated by dotted lines in FIG. 1, of the motor-vehicle chassis comprising the structural embodiment according to the invention.

An embodiment of motor-vehicle chassis 1 is described hereinafter with reference to FIGS. 1 and 2.

The chassis is in particular an electric or hybrid motor-vehicle chassis, especially a chassis of a four-wheel electric vehicle.

The chassis comprises, preferably in its middle part, a structure 2 intended to hold an electric battery 3, especially to hold an electric battery for powering an electric drive motor for the motor vehicle.

The chassis extends in longitudinal direction x, wherein this longitudinal direction is that of displacement of the vehicle in a straight line. The transversal direction perpendicular to the longitudinal direction is marked y and the vertical direction perpendicular to the two foregoing directions is marked z.

The structure comprises:
a rigid element 7, 6a, 6b, above which the battery is intended to be disposed; and
energy-absorbing elements 4a, 5a, 4b, 5b, disposed laterally on both sides of the rigid element.

Preferably the rigid element comprises two frame rails 6a, 6b extending at least substantially parallel to one another and extending at least substantially in longitudinal direction x. These frame rails are made, for example, from metal profile sections, especially of aluminum or steel. These frame rails may have rectangular cross section.

Preferably the rigid element comprises cross members mechanically connecting the two frame rails, for example four cross members 7 as represented in the figures. The cross members may extend at least substantially in lateral direction y. These cross members are made, for example, from metal profile sections, especially of aluminum or steel. They may have rectangular cross section.

For example, the height of the cross members is smaller than that of the frame rails. Thus the upper face of the cross members may be set back relative to the upper face of the frame rails.

The cross members may be fastened to the frame rails by means of gussets. Alternatively, they may fastened to the frame rails by welds or any other fastening means.

Preferably the length of the cross members is greater than the width L of the battery. Thus the battery may be disposed on the cross members between the frame rails. Preferably, as represented in FIG. 2, a clearance J is left on both sides of the battery between the battery and the ends of the cross members or between the battery and the ends of the rigid element.

Preferably the energy-absorbing element comprises two beams 4a, 4b, especially beams with side apron or side aprons, extending at least substantially parallel to one another and extending at least substantially in longitudinal direction x. These beams are made, for example, from metal profile sections, especially of aluminum or steel. These beams may have rectangular cross section.

Preferably the energy-absorbing element comprises deformable members mechanically connecting the rigid element with the beams, for example four deformable members 5a, 5b as represented in the figures. Deformable members 5a, 5b may extend at least substantially in lateral direction y. These deformable elements are made, for example, from metal profile sections, especially of aluminum or steel, or from profile sections of synthetic materials. They may have rectangular cross section. They may comprise means 8a, 8b favoring or guiding their deformation. These means 8a, 8b are, for example, holes made in the members. The deformable members preferably have properties of absorbing considerable energy in collision situations, particularly in case of side collision, in other words in case of collision due to violent and lateral application of a mechanical action Fa or Fb on the structure, particularly a mechanical action applied at least substantially parallel to transversal direction y.

The deformable elements may be fastened to the frame rails and to the beams by welds or any other fastening means.

For example, the height of the deformable members is smaller than that of the beams and/or the height of the deformable members is smaller than that of the frame rails. At least certain energy-absorbing elements may be disposed in the alignment of the cross members. Preferably all the energy-absorbing elements are disposed in the alignment of the cross members.

In one variant, the structure may comprise means for flanging (not shown) the battery onto the structure. For example, these flanging means may be provided on arches 9a and 9b, especially arches fastened on the rigid element and/or longitudinally straddling the battery.

Throughout this document, the phrase "rigid element" is understood as any element that deforms less than an "energy-absorbing element" during a collision against the structure, particularly during a side collision, especially during a crash test perpendicular to a pole. Preferably the rigid element does not deform during a crash test perpendicular to a pole or deforms in its elastic domain during the perpendicular crash test. In contrast, the energy-absorbing element deforms during the crash test perpendicular to a pole. It deforms in its plastic domain. Thus, at the end of the crash test, the energy-absorbing element remains deformed while the rigid element has retained or recovered its initial shape. The energy-absorbing element is designed to absorb a maximum of the collision energy.

Alternatively, the rigid element may also deform in the plastic domain during a perpendicular crash test. However, it deforms laterally less than the energy-absorbing element. In particular, it deforms sufficiently little that the integrity of the battery is assured. The clearance J mentioned in the foregoing is dimensioned for this purpose. Furthermore, during a side collision, the rigid element is deformed in its plastic domain only when the energy-absorbing element is completely deformed, especially when a beam is in contact against a frame rail.

Preferably the rigid element is characterized by transversal rigidity greater than the transversal rigidity of the energy-absorbing elements. The transversal rigidities of the energy-absorbing elements and of the rigid elements are sufficiently different to assure that, during a perpendicular side crash test, the rigid element does not deform or deforms in its elastic domain, whereas the energy-absorbing element deforms in its plastic domain. Preferably the rigid element is at least 1.2 times stiffer than the energy-absorbing element.

In all cases, the rigidity of the rigid element makes it possible to guarantee the integrity of battery casing 3 during a perpendicular side crash test against a pole.

In the embodiment described in the foregoing, the rigid element extends underneath the battery. However, in another embodiment, not shown, the rigid element may be arranged alternatively or additionally so as to extend above the battery when this is set in its place in the structure.

Preferably the area of the vertical projection of the battery is included or at least substantially included in the area of the vertical projection of the rigid element. By "area of the vertical projection of the rigid element" there is understood the envelope area of the vertical projection. Thus, if the energy-absorbing element is composed of two parallel frame rails connected by two cross members perpendicular to the frame rails, then the area of the vertical projection is a rectangle whose limits are defined by the two cross members and the two frame rails.

A motor-vehicle chassis may comprise one or the other of the structural embodiments described in the foregoing. Such a chassis may be used to equip a motor vehicle, especially an electric motor vehicle, for example a four-wheel electric vehicle.

By virtue of the invention, the structure has continuous transversal reinforcement of the underframe, whether or not it is multiple, guaranteeing optimal integrity of the battery.

The structural embodiments described in the foregoing have the following advantages:

In the case of low-energy collisions, it is possible to repair the structure: in effect, only the beams and the deformable members are then damaged and the rigid element is intact. It is then sufficient to replace the damaged beam and the damaged deformable members.

The presence of a rigid structure only locally makes it possible to achieve a lightweight structure.

Throughout this text, the term "at least substantially" used with different adjectives means: "adjective" or "substantially adjective", for example "at least substantially perpendicular" means "perpendicular" or "substantially perpendicular".

The invention claimed is:

1. A structure for a motor vehicle, the structure comprising:
    an electric battery that powers an electric motor or an electric drive motor of the motor vehicle;

a rigid element including frame rails that extend at least substantially in a longitudinal direction and cross members extending between inside faces of the frame rails, the battery being positioned in direct contact with the cross members and between the frame rails;

arches fastened to a cross member of the cross members to hold the battery onto the structure; and energy-absorbing elements positioned laterally on each side of the rigid element, the energy-absorbing elements comprising deformable members that extend from outside faces of the frame rails at least substantially in a lateral direction, wherein a height of the deformable members is smaller than a height of the frame rails of the rigid element.

2. A structure according to claim 1, wherein an area of a vertical projection of the battery is included or at least substantially included in an area of a vertical projection of the rigid element.

3. A structure according to claim 1, wherein the rigid element comprises two of the frame rails connected to one another by a plurality of the cross members.

4. A structure according to claim 1, wherein the energy-absorbing elements comprise two beams disposed at least substantially in the longitudinal direction on both sides of the rigid element.

5. A structure according to claim 1, wherein the energy-absorbing elements comprise two beams disposed at least substantially in the longitudinal direction on both sides of the rigid element and the deformable members mechanically connect the rigid element to the beams.

6. A motor-vehicle chassis comprising a structure according to claim 1.

7. A hybrid or electric motor vehicle, or a four-wheel electric vehicle, comprising a structure according to claim 1.

8. A structure according to claim 1, wherein a height of the cross members is smaller than a height of the frame rails of the rigid element.

9. A structure according to claim 1, wherein the deformable members include holes to favor or guide their deformation.

10. A structure according to claim 1, wherein the deformable members have a rectangular cross section.

11. A structure according to claim 1, wherein a transversal rigidity of the rigid element is greater than a transversal rigidity of the energy-absorbing elements.

12. A structure according to claim 1, wherein all of the deformable members are positioned in alignment with the cross members.

13. A structure according to claim 4, wherein the height of the deformable members is smaller than a height of the two beams of the energy-absorbing elements.

14. A structure according to claim 1, wherein the battery is positioned on top of the cross members and the arches extend from the cross member over a top of the battery.

15. A structure according to claim 1, wherein the battery is positioned such that a clearance is included between sides of the battery and ends of the cross members.

* * * * *